United States Patent
Choi

(10) Patent No.: US 11,306,756 B2
(45) Date of Patent: Apr. 19, 2022

(54) BED FRAME CONNECTING PIECE

(71) Applicant: Inno-Sports Co., Ltd, Xiamen (CN)

(72) Inventor: Kwanjun Choi, Xiamen (CN)

(73) Assignee: Inno-Sports Co., Ltd, Xiamen (CN)

( * ) Notice: Subject to any disclaimer, the term of this patent is extended or adjusted under 35 U.S.C. 154(b) by 0 days.

(21) Appl. No.: 17/006,902

(22) Filed: Aug. 31, 2020

(65) Prior Publication Data

US 2021/0062843 A1   Mar. 4, 2021

(30) Foreign Application Priority Data

Aug. 29, 2019 (CN) .......................... 201921424192.3

(51) Int. Cl.
*F16B 12/56* (2006.01)
*A47C 19/02* (2006.01)

(52) U.S. Cl.
CPC ............ *F16B 12/56* (2013.01); *A47C 19/021* (2013.01)

(58) Field of Classification Search
CPC .......... F16B 12/56; F16B 12/54; F16B 12/58; A47C 19/021; A47C 19/022; A47C 19/028; A47C 19/025; A47C 21/022; A47C 21/02; A47C 23/007; A47G 9/0292; Y10T 24/23
See application file for complete search history.

(56) References Cited

U.S. PATENT DOCUMENTS

| | | | | |
|---|---|---|---|---|
| 673,945 | A * | 5/1901 | Foster | A47C 19/025 5/207 |
| 3,188,664 | A * | 6/1965 | Goldberg | F16B 12/52 5/282.1 |
| 4,627,120 | A * | 12/1986 | Harris | A47C 19/024 5/310 |
| 8,316,485 | B2 * | 11/2012 | Lee | A47C 19/12 5/201 |
| 9,913,544 | B1 * | 3/2018 | Weinschreider | A47C 19/045 |
| 2010/0319124 | A1 * | 12/2010 | Turnbull | A47C 23/007 5/254 |

OTHER PUBLICATIONS

Merriam-Webster. (2019). Notch. In Merriam-Webster. https://web.archive.org/web/20190710203447/https://www.merriam-webster.com/dictionary/notch (Year: 2019).*

* cited by examiner

*Primary Examiner* — Robert G Santos
*Assistant Examiner* — Alison N Labarge
(74) *Attorney, Agent, or Firm* — Bayramoglu Law Offices LLC

(57) ABSTRACT

A bed frame connecting piece includes a first connecting piece connected to a horizontal rail of the bed frame and a second connecting piece connected to a vertical rail of the bed frame. A notch part is provided between the first connecting piece and the second connecting piece, and a reinforcing member is provided between the first connecting piece and the second connecting piece. The reinforcing member is located at the notch part and arranged at an inner end of the bed frame connecting piece. One end of the bed frame connecting piece is a narrow edge, the other end of the bed frame connecting piece is a wide edge, and the notch part is arranged at the wide edge. A bed frame includes the above bed frame connecting piece.

19 Claims, 5 Drawing Sheets

BED FRAME CONNECTING PIECE

CROSS-REFERENCE TO THE RELATED APPLICATION

This application is based upon and claims priority to Chinese Patent Application No. 201921424192.3, filed on Aug. 29, 2019, the entire contents of which are incorporated herein by reference.

TECHNICAL FIELD

The present invention relates to furniture, and more particularly, to a bed frame connecting piece.

BACKGROUND

Most existing bed frames are not provided with a bed frame connecting piece for supporting the bed cover on the bed frame. Even if the bed frame is provided with a bed frame connecting piece, during transportation, the bed frame, bed frame connecting piece, bed rail, backrest and other parts of the bed will be disassembled for packaging and transport. However, a bed frame connecting piece is typically composed of a first connecting piece and a second connecting piece. When the bed frame connecting piece is packaged, the first connecting piece and the second connecting piece are placed on the ground and then packaged. The height between the matching line of the outer end of the bed frame connecting piece and the ground will be gradually increased, so it is not convenient for the operator to pack, and it also takes up a large space.

SUMMARY

In order to solve the above technical problem, the purpose of the invention is to provide a bed frame connecting piece, which specifically enables the matching line of the bed frame connecting piece in the packaging to be at the same height from the ground, thus facilitating the packaging and transportation by the operator.

The invention is achieved by the following technical solution:

A bed frame connecting piece includes a first connecting piece connected to a horizontal rail of the bed frame and a second connecting piece connected to a vertical rail of the bed frame. A notch part is provided between the first connecting piece and the second connecting piece. A reinforcing member is provided between the first connecting piece and the second connecting piece, and the reinforcing member is located at the notch part and arranged at an inner end of the bed frame connecting piece.

In the embodiment of the invention, one end of the bed frame connecting piece is a narrow edge, the other end of the bed frame connecting piece is a wide edge, and the notch part is arranged at the wide edge.

In the embodiment of the invention, a fixing part symmetrically arranged along a central axis is provided on the first connecting piece and the second connecting piece.

In the embodiment of the invention, a hollow part symmetrically arranged along a central axis is provided on the first connecting piece and the second connecting piece.

In the embodiment of the invention, the bed frame is provided with the bed frame connecting piece.

The bed frame connecting piece of the present invention has the following advantages. The notch part is designed to enable the matching line of the bed frame connecting piece in the packaging to be at the same height from the ground, facilitating the packaging and transport by the operator. The reinforcing member is configured to ensure the stability of the bed frame connecting piece, and enhance the bearing capacity of the bed frame connecting piece with the notch.

BRIEF DESCRIPTION OF THE DRAWINGS

To clearly illustrate the technical solutions in the embodiments of the present invention, the following briefly describes the drawings required for describing the embodiments or the prior art. Apparently, the drawings in the following description show some embodiments of the present disclosure, and a person of ordinary skill in the art may still derive other drawings from these drawings without creative efforts.

Figure 1:
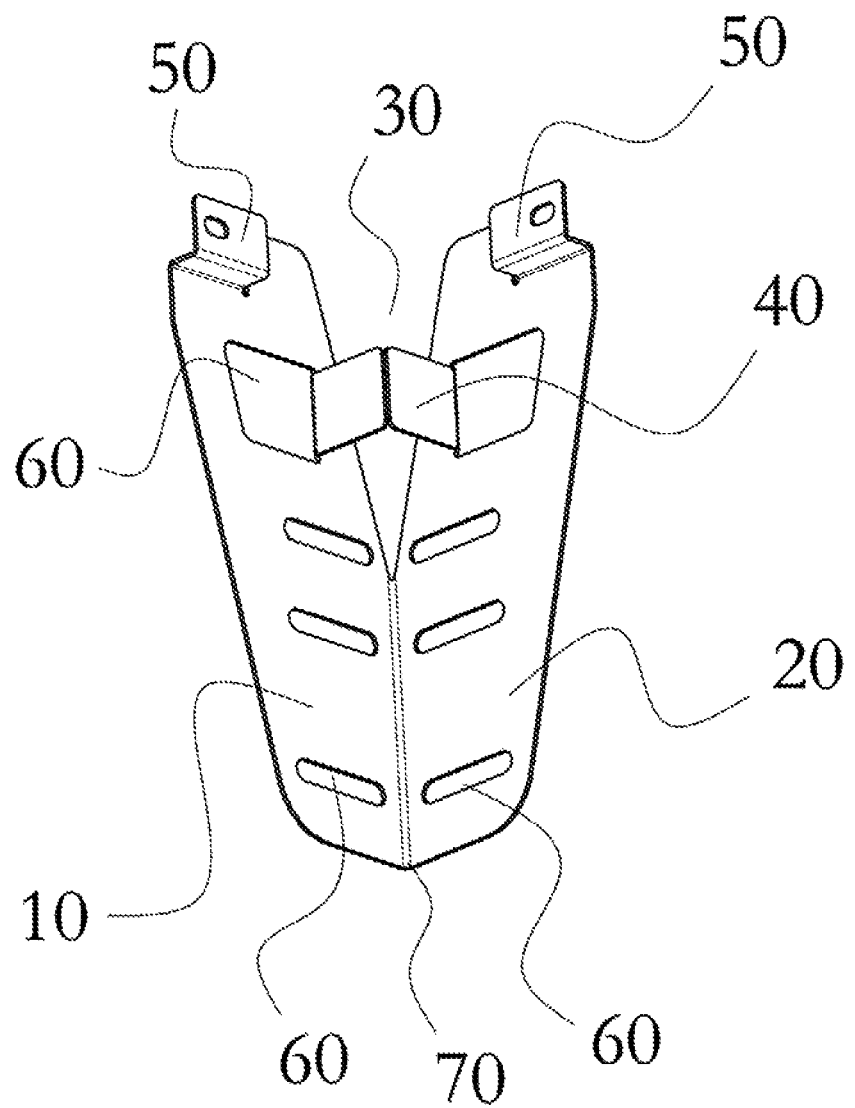
FIG. 1 is a first perspective view of the present invention.
Figure 2:
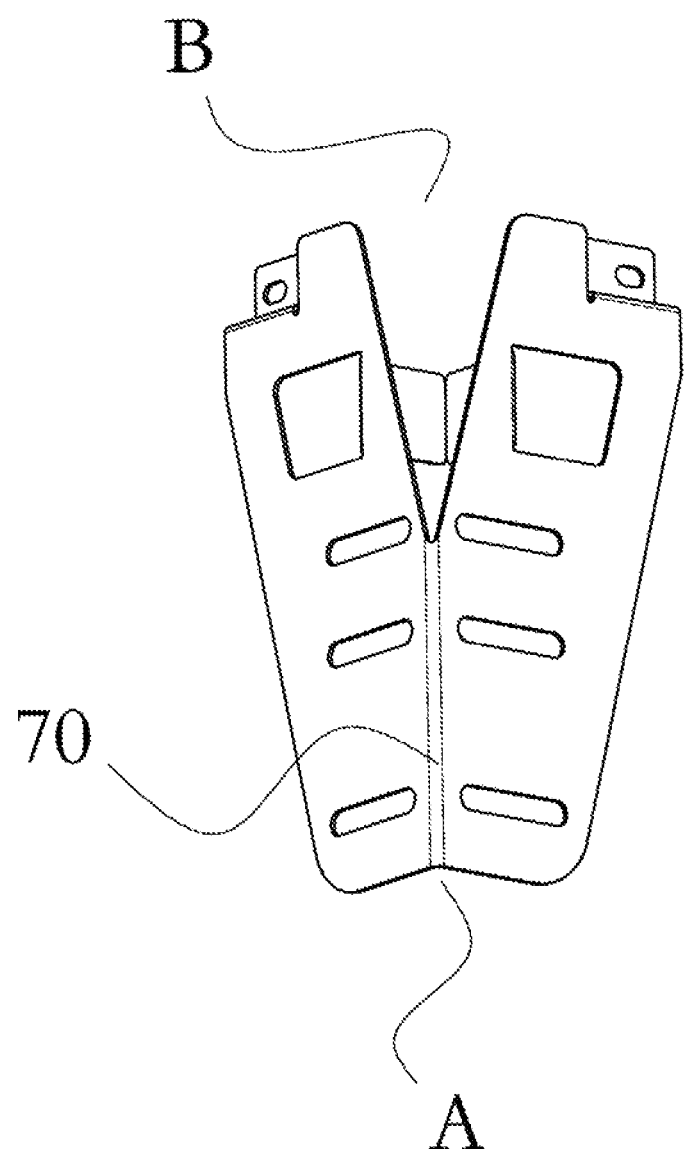
FIG. 2 is a second perspective view of the present invention.

In the drawings: 10—first connecting piece; 20—second connecting piece; 30—notch part; 40—reinforcing member; 50—fixing part; 60—hollow part; 70—matching line; A—narrow edge; B—wide edge.

DETAILED DESCRIPTION OF THE EMBODIMENTS

The specific embodiments of the present invention will be further described clearly and completely below with reference to the accompanying drawings. Apparently, the embodiments in the following description are part of the present invention, rather than all implementations. Based on the embodiments of the present invention, all other embodiments obtained by those of ordinary skill in the art without creative work shall fall within the protection scope of the present invention.

With reference to the drawings of the description, a bed frame connecting piece, including the first connecting piece 10 connected to a horizontal rail of the bed frame and the second connecting piece 20 connected to a vertical rail of the bed frame, wherein the notch part 30 is provided between the first connecting piece 10 and the second connecting piece 20, and the reinforcing member 40 is provided between the first connecting piece 10 and the second connecting piece 20, the reinforcing member 40 is located at the notch part 30 and arranged at an inner end of the bed frame connecting piece. More specifically, one end of the bed frame connecting piece is the narrow edge A, and the other end of the bed frame connecting piece is the wide edge B. The notch part is arranged at the wide edge B. Besides, the fixing part 50 symmetrically arranged along a central axis is provided on the first connecting piece 10 and the second connecting piece 20. The hollow part 60 symmetrically arranged along a central axis is provided on the first connecting piece 10 and the second connecting piece 20. In the invention, through the design of the above structure, the matching line 70 of the bed frame connecting piece can be at the same height from the ground in the packaging, which overcomes the problem of the traditional bed frame connecting piece, that is, the traditional bed frame connecting piece is gradually enlarged from the narrow edge to the wide edge. In this way, the present invention ensures the convenience of the operator when packaging, and at the same time, the bed frame connecting piece in the application has a smaller occupation space than the traditional bed frame connecting piece.

Figure 3:
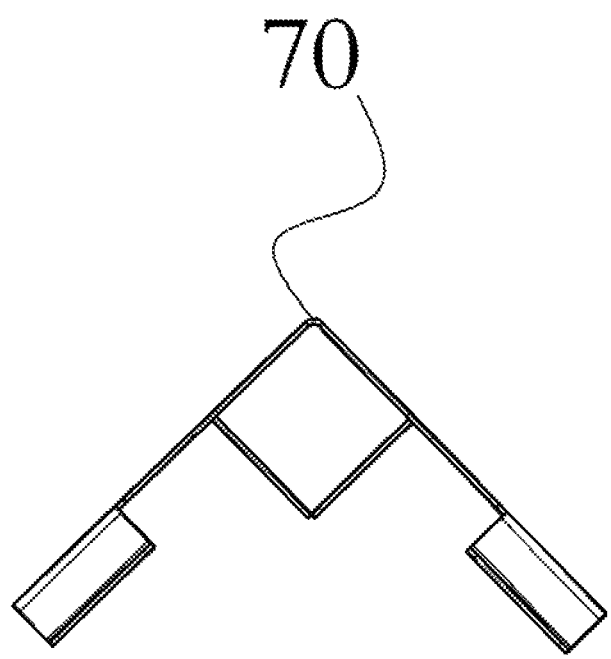
FIG. 3 is a schematic diagram of the present invention.

As can be seen from FIG. 3, during use, the edges of the first connecting piece 10 and the second connecting piece 20 are facing downward, and the matching line 70 is upward. The matching line 70 looks like a dot from the side view.

Figure 4:
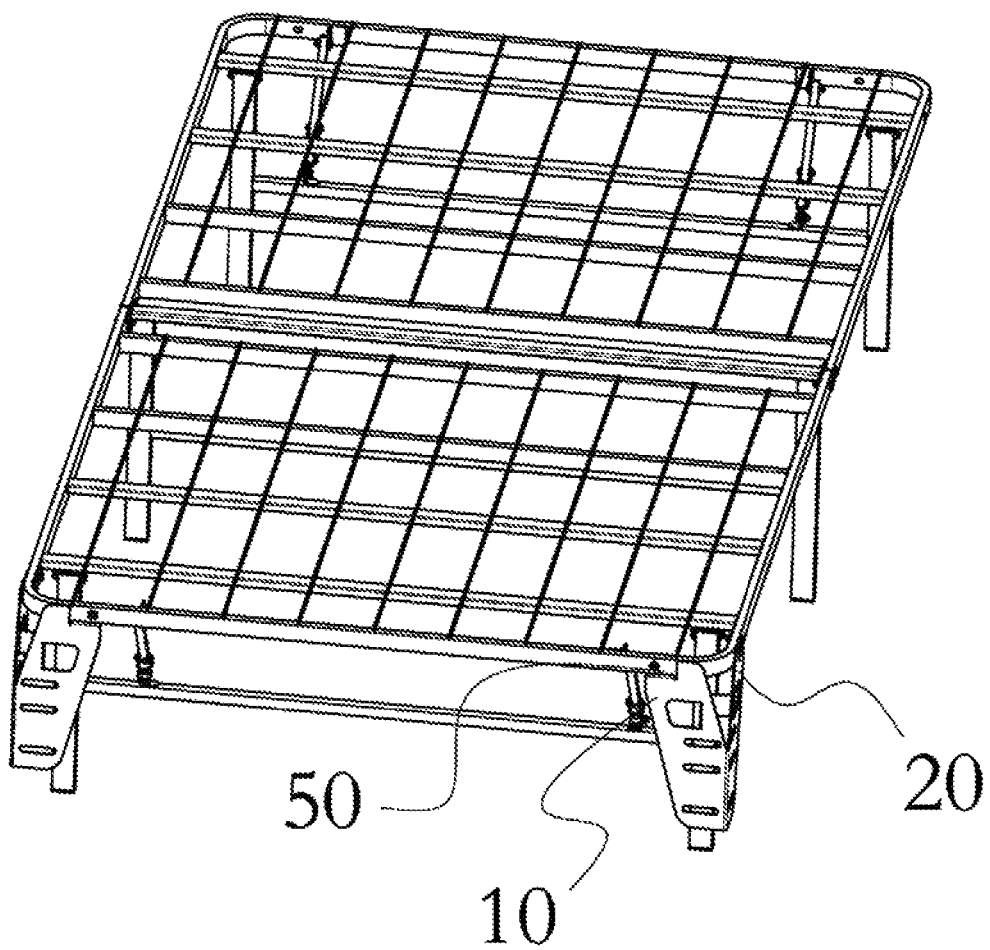
FIG. 4 is a schematic diagram of embodiment 1 of the present invention.
Figure 5:
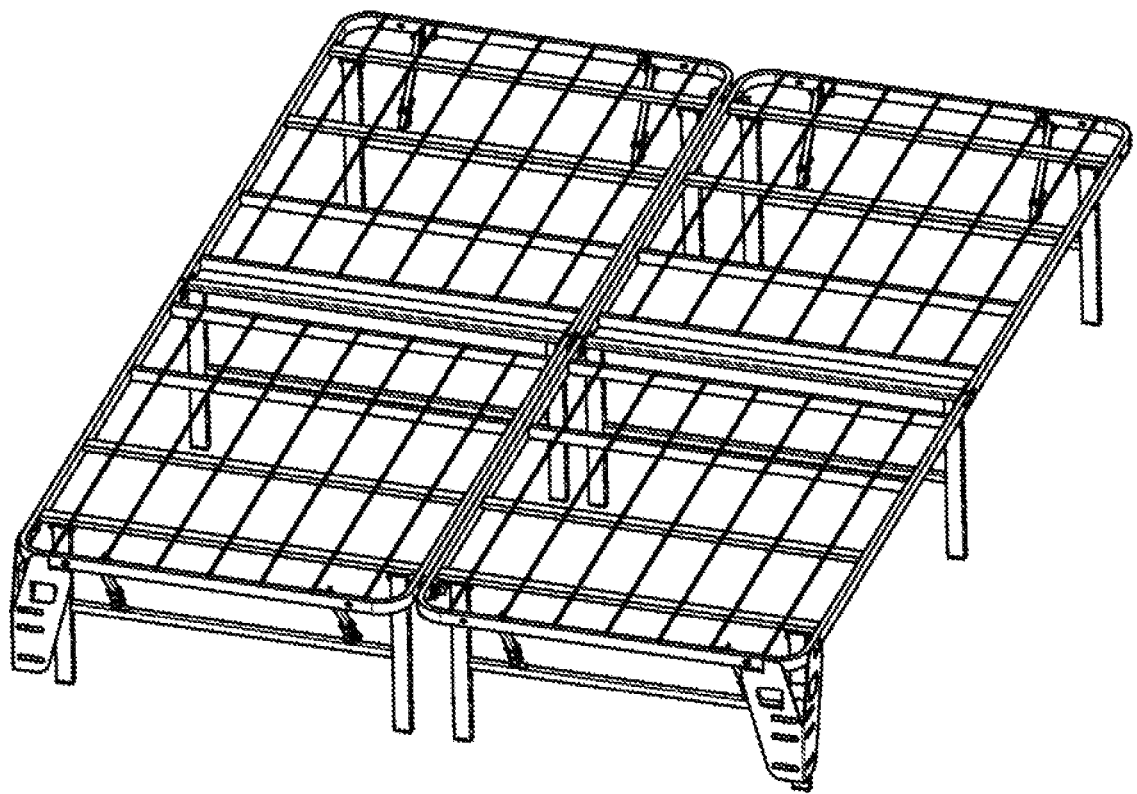
FIG. 5 is a schematic diagram of embodiment 2 of the present invention.

In a preferred embodiment, the bed frame connecting piece is arranged at the corner end of the bed frame. As shown in FIG. 4 or 5 of the specification, the bed framed connecting piece is used to support the bedspread, which ensures the tidiness and beauty of the bedspread. Of course, the bedstead is generally a single bed, a double bed, and other types of bedstead. More specifically, the fixing part 50 of the bed frame connecting piece is a recess, and the recess is configured to receive the side rails of the bed frame, and then is fastened and installed by fasteners.

The above description shows and describes the preferred embodiments of the present invention. As mentioned above, it should be understood that the present invention is not limited to the form disclosed herein, and should not be regarded as the exclusion of other embodiments, but can be used for various other combinations, modifications, and environments, and can be modified through the above teachings or technology or knowledge in related fields within the scope of the invention concept described herein. The modifications and changes made by those skilled in the art do not depart from the spirit and scope of the invention, and should fall within the protection scope of the appended claims of the invention.

What is claimed is:

1. A bed frame connecting piece, comprising
   a first connecting piece connected to a horizontal rail of a bed frame, and
   a second connecting piece connected to a vertical rail of the bed frame, wherein
   a notch part is provided between the first connecting piece and the second connecting piece,
   a reinforcing member is provided between the first connecting piece and the second connecting piece, and the reinforcing member is located at the notch part and arranged at an inner end of the bed frame connecting piece;
   wherein a first vertical wall end of the reinforcing member is perpendicularly attached to the first connecting piece and a second vertical wall end of the reinforcing member is perpendicularly attached to the second connecting piece, wherein the first vertical wall end and the second vertical wall end are spatially separated from each other.

2. The bed frame connecting piece according to claim 1, wherein a fixing part is symmetrically arranged along a central axis of the bed frame connecting piece and is provided on each of the first connecting piece and the second connecting piece, and the fixing part is configured to fix and match the bed frame connecting piece with the bed frame.

3. The bed frame connecting piece according to claim 2, wherein the fixing part is a recess.

4. The bed frame connecting piece according to claim 1, wherein a hollow part is symmetrically arranged along a central axis of the bed frame connecting piece and is provided on the first connecting piece and the second connecting piece.

5. The bed frame connecting piece according to claim 1, wherein a first end of the bed frame connecting piece is a narrow edge, a second end of the bed frame connecting piece is a wide edge, and the notch part is arranged at the wide edge.

6. The bed frame comprising the bed frame connecting piece according to claim 1.

7. The bed frame according to claim 6, wherein four corners of the bed frame are provided with the bed frame connecting piece.

8. The bed frame connecting piece according to claim 2, wherein a first end of the bed frame connecting piece is a narrow edge, a second end of the bed frame connecting piece is a wide edge, and the notch part is arranged at the wide edge.

9. The bed frame connecting piece according to claim 3, wherein a first end of the bed frame connecting piece is a narrow edge, a second end of the bed frame connecting piece is a wide edge, and the notch part is arranged at the wide edge.

10. The bed frame connecting piece according to claim 4, wherein a first end of the bed frame connecting piece is a narrow edge, a second end of the bed frame connecting piece is a wide edge, and the notch part is arranged at the wide edge.

11. The bed frame according to claim 6, wherein a fixing part is symmetrically arranged along a central axis of the bed frame connecting piece and is provided on each of the first connecting piece and the second connecting piece, and the fixing part is configured to fix and match the bed frame connecting piece with the bed frame.

12. The bed frame according to claim 11, wherein the fixing part is a recess.

13. The bed frame according to claim 6, wherein a hollow part is symmetrically arranged along a central axis of the bed frame connecting piece and is provided on the first connecting piece and the second connecting piece.

14. The bed frame according to claim 6, wherein a first end of the bed frame connecting piece is a narrow edge, a second end of the bed frame connecting piece is a wide edge, and the notch part is arranged at the wide edge.

15. The bed frame according to claim 11, wherein four corners of the bed frame are provided with the bed frame connecting piece.

16. The bed frame according to claim 12, wherein four corners of the bed frame are provided with the bed frame connecting piece.

17. The bed frame according to claim 13, wherein four corners of the bed frame are provided with the bed frame connecting piece.

18. The bed frame according to claim 14, wherein four corners of the bed frame are provided with the bed frame connecting piece.

19. The bed frame connecting piece according to claim 4, wherein first vertical wall end of the reinforcing member is attached at the hollow part provided on the first connecting piece and the second vertical wall end of the reinforcing member is attached at the hollow part provided on the second connecting piece.

* * * * *